N. E. AUSTIN.
ANIMAL TRAP.
APPLICATION FILED MAR. 2, 1909.
942,878.
Patented Dec. 14, 1909.
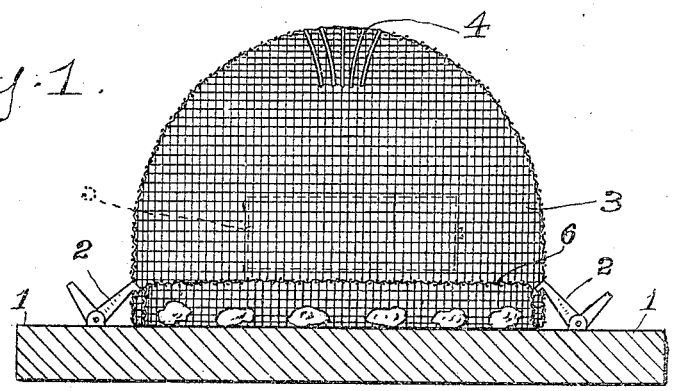
Fig. 1.
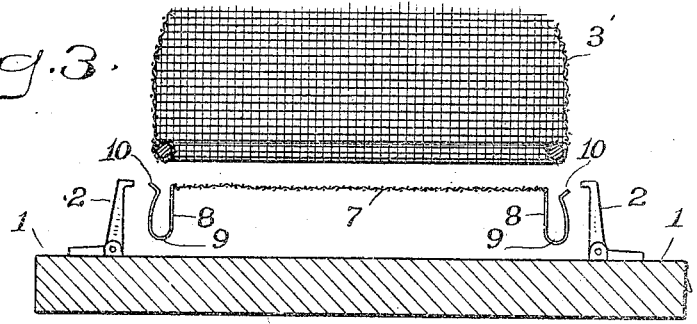
Fig. 3.
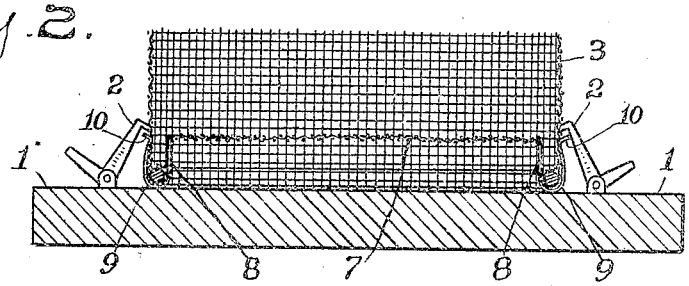
Fig. 2.
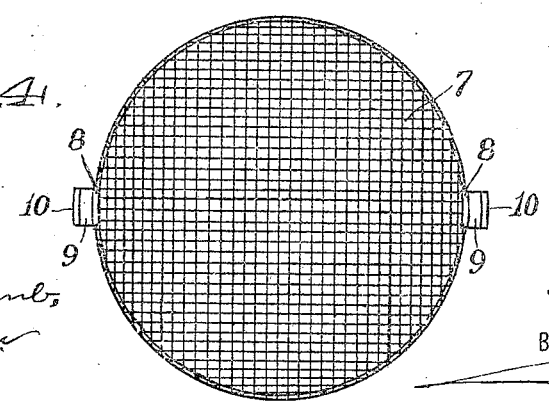
Fig. 4.
WITNESSES:
H. A. Lamb
M. J. Longden
INVENTOR
N. E. Austin
BY 
ATTORNEY

UNITED STATES PATENT OFFICE.

NELSON E. AUSTIN, OF DANBURY, CONNECTICUT.

ANIMAL-TRAP.

942,878.  Specification of Letters Patent.  Patented Dec. 14, 1909.

Application filed March 2, 1909. Serial No. 480,910.

*To all whom it may concern:*

Be it known that I, NELSON E. AUSTIN, a citizen of the United States, residing at Danbury, in the county of Fairfield and State of Connecticut, have invented certain new and useful Improvements in Animal-Traps; and I do hereby declare the following to be a full, clear, and exact description of the invention, such as will enable others skilled in the art to which it appertains to make and use the same.

My invention relates to animal traps and has for its object to provide a device of this description in which a separate bait chamber is provided so that the bait itself may never be disturbed by the animal while at the same time the trap is exceedingly simple and may be readily cleansed.

With these ends in view my invention consists in the details of construction and combination of parts hereinafter fully described and then particularly pointed out in the claims which conclude this description.

In the accompanying drawing Figure 1 is a sectional elevation of my improved trap—Fig. 2 a sectional elevation showing a modification of my improvement—Fig. 3 a sectional elevation showing the parts of the modification illustrated at Fig. 2 in proper relative position preparatory to assembly, and Fig. 4 a detail plan view of the floor of the trap shown at Fig. 2.

Similar numbers of reference denote like parts in the several figures of the drawing.

My invention particularly has reference to a specific form of animal trap such as may be readily constructed and wherein the bait may always be exposed, while at the same time, when the trap is removed for the purposes of cleansing, the base of the trap which supports the bait need not be disturbed at all.

Referring to Fig. 1, 1 is the base, preferably made from wood and having pivoted thereon hook levers 2. 3 is the main body portion or cage of the trap which is made from open mesh wire and which has an inlet 4 whereby entrance may be afforded to the animals, and which is provided with a door 5 (shown in dotted lines) for the removal of the animals after they have been drowned or otherwise disposed of. The bottom of the woven wire trap is forced upwardly or countersunk so as to form a floor 6 in a plane above the bottom edge of the cage, and the cage is secured to the base 1 by means of the hook levers 2, so that the space between the floor 6 and the base will constitute a bait chamber. This chamber is exposed not only through the floor but through the sides of the lower portion of the trap, thus offering an allurement to the animals, and when the latter are caught within the trap they cannot get at the bait. By loosening the hook levers 2 the trap may be removed for the purpose of drowning the animals or for cleansing, without disturbing the bait.

Referring to Fig. 2, I have illustrated a construction in which the bottom or floor portion of the trap is made separate from the main cage portion, and in this instance the cage 3 is formed without any bottom and a separate floor 7 made of open mesh wire is constructed so as to fit snugly within the bottom of the cage portion. 8 are spring clips which depend from the floor 7 at opposite sides thereof and are bent upwardly so as to form loops 9 at their lower ends, the upper extremities of these clips being formed into beveled hooks 10. The parts are assembled by forcing the floor 7 up within the cage 3 until said cage seats against the loops 9, whereupon the beveled hooks 10 will engage with the wires of the cage and thereby hold the parts together. When this construction shown at Fig. 2 is removed from the base for any obvious purpose, the floor may readily be removed by withdrawing one of the hooks 10 from engagement with the cage, and this affords a very simple means for discharging dead animals from the trap.

Having thus described my invention what I claim as new and desire to secure by Letters Patent is:—

1. An animal trap, comprising a base, an open mesh wire cage having an inlet at its top, an open mesh wire floor within said cage at a plane above the lower edge thereof, clips carried by said floor and depending therefrom, said clips receiving and engaging said lower edge of the cage whereby said floor is removably related to said cage, and means for securing said cage to said base, said means comprising hooked levers pivoted to said base and adapted to engage in the wire mesh, at the sides of said cage.

2. An animal trap, comprising a base, an open mesh wire cage seated upon said base, a removable floor within said cage, said floor being disposed in a plane above the lower edge of said cage, a plurality of U-shaped clips carried by said floor, one leg of each of said U-shaped clips being secured to the periphery of said floor, the other leg of each of said U-shaped clips formed at its free end with a beveled hook, the lower edge of said cage being received between the legs of the U-shaped clips, said beveled hooks impinging the outer sides of said cage.

In testimony whereof I affix my signature in presence of two witnesses.

NELSON E. AUSTIN.

Witnesses:
E. M. BULKLEY,
INA B. SEYMOUR.